United States Patent Office 3,279,952
Patented Oct. 18, 1966

3,279,952
ELECTRIC CURRENT-PRODUCING CELL HAVING ACETIC ANHYDRIDE ELECTROLYTE SOLVENT
Leonard John Minnick, Cheltenham, Pa., assignor to G. & W. H. Corson, Incorporated, Plymouth Meeting, Pa., a corporation of Delaware
No Drawing. Filed Sept. 9, 1964, Ser. No. 395,301
1 Claim. (Cl. 136—100)

The present invention relates to a novel electric current-producing cell, and to a novel method of generating electric current using the same; and, more particularly, the present invention relates to an improved electric current-producing cell system in which the principal solvent is acetic anhydride instead of water as is the case with conventional electric current-producing cells. The invention also relates to a battery comprising two or more of such simple cells.

While water is the solvent employed in conventional cells, the use of certain organic liquids has been suggested, as in U.S. Patents 2,597,451; 2,597,452; 2,597,453; 2,597,454; 2,597,455 and 2,597,456. The use of liquid ammonia has also been disclosed (see, for example, U.S. Patent 2,863,933).

The principal object of the present invention is to provide a novel improved electric current producing cell.

Another object of the present invention is to provide an electric current-producing cell employing a non-aqueous solvent and capable of use over a wide temperature range from well below the freezing point of water to well above the boiling point of water.

A further object of the present invention is to provide an electric current-producing cell, employing highly active anode metals (alkali- and alkaline-earth metals), capable of extended wet shelf life and of providing a good range of temperature performance over a wide number of drain rate applications.

Still another object is to provide an improved electric current-producing cell capable of high energy outputs.

These and other objects, including the provision of a novel method of generating electric current, will become apparent from a consideration of the following specification and the claim.

The novel electric current-producing cell of the present invention consists essentially of an anode, a cathode and an electrolyte solvent system in which the solvent consists essentially of acetic anhydride.

The present cell may be primary or secondary, and may or may not be of the deferred action type depending upon whether one or more of the elements is held out of contact from the others until the time of activation. In this connection the present invention is not concerned with the details of construction of the cell, and the principles of the present invention may be utilized by those skilled in the art to construct any of the aforementioned basic types of cells—the present invention being based essentially on the use of acetic anhydride as solvent for electric current-producing cell systems, with a highly active anode and a suitable cathode material.

The solvent of the electrolyte of the present cell will consist essentially of acetic anhydride. This material is liquid over a wide temperature range—freezing at −73° C. and boiling at 140° C. Since it is not electrically conductive it will have ionizable material dissolved therein to render it conductive, as is the case when water is used as an electrolyte solvent. Especially suitable salts are the perchlorates. The alkali- and alkaline-earth metal salts are preferred. In this connection, it is desirable to employ a salt, the cation of which is a metal at least as electropositive as the anode metal. Other salts soluble and ionizable in acetic anhydride to render it electrically conductive may be used. While the concentration of solute may vary widely to provide a conductivity of at least about $10^{-3}$ ohms$^{-1}$ cm.$^{-1}$, it is advisable to have a concentration of at least 0.1 M, and the concentration may go up to saturation. Generally, a concentration of from about 0.2 M to about 5 M will be found to be satisfactory.

The anode will be an electropositive metal, especially an alkali metal, like sodium, potassium and lithium, or an alkaline earth metal, like calcium and magnesium. Lithium is preferred. The anode metal may be associated with another metal, such as in alloy form with a less active metal if reduced activity is desired, or in contact with another metal structure, such as a nickel or silver screen, which serves as the anode conductor.

The cathode (which will be a depolarizing cathode) is the site of the reduction reaction and requires a material that is reducible electrochemically (often referred to as the "depolarizer") and a cathode conductor (often referred to as the "cathecter"). The cathode material should have a potential (open circuit) at least about 1 volt less than that of the anode.

Suitable cathode materials (depolarizers) are metal compounds, like mercuric sulfate, silver chloride, cupric fluoride, cupric chloride, cobaltous chloride, cobaltous fluoride, nickelous chloride, nickelous fluoride, cupric sulfide, magnesium oxide, sodium fluorborate, aluminum chloride, manganese dioxide and the like; sulfur; as well as organic oxidizing agents, like trichlorocyanuric acid and salts thereof. The cupric salts are presently preferred, especially the halides.

A suitable cathecter may be prepared from carbon, silver or any other electrically conductive material inert to the electrolyte.

As will be apparent to those skilled in the art, two or more cells may be associated and connected together electrically to provide a battery.

The invention will be more readily understood from a consideration of the following specific examples which are given for the purpose of illustration and are not intended to limit the scope of the invention in any way.

EXAMPLE I

A mixture of 11 grams of anhydrous cupric fluoride and 2 grams of graphite was packed into a filter paper extraction thimble of 80 x 33 mm. dimensions. A ¼" diameter carbon rod (cathecter) was then thrust down into the center of the mix. The resulting cathode was immersed, to a depth of one and three-eights inches, in acetic anhydride saturated with anhydrous lithium perchlorate and held in a glass cell compartment equipped with a top through which the electrode wire leads project. A wire lead is attached to the free end of the carbon rod cathecter. Just outside the thimble there was immersed in the electrolyte, to a depth of one and three-eighths inches, an anode prepared by pressing pure lithium metal into a nickel screen. A wire lead is attached to the free end of the anode. The two wire leads were connected to a circuit containing a small light bulb to form a load and appropriate meters for recording voltage and current. Upon completion of the circuit, an initial voltage of 2.4 volts and a current of 20 milliamperes were recorded. After this primary cell ran for 70 hours, the cell voltage reached 1.65 volts and operation of the cell was discontinued. At random intervals open circuit voltages were recorded which ranged from 3.15 volts initially to 2.85 volts at the end of the run.

EXAMPLES II–VII

Employing the same materials and structure as in Example I, other cathode materials (depolarizers) were used in place of cupric fluoride with the following results:

*Table I*

| Ex. | Depolarizer | Initial Closed Circuit Voltage (Volts) | Average Current (Ma.) | Time to 70% of Initial Closed Circuit Voltage (Hrs.) |
|---|---|---|---|---|
| II | Cupric sulfide | 2.8 | 20 | 14 |
| III | Manganese dioxide | 3.1 | 50 | 6 |
| IV | Cupric chloride | 2.9 | 18–21 | 4 |
| V | Silver chloride | 2.0 | 16–17 | 4.5 |
| VI | Sodium fluoroborate | 1 | 20 | 4.5 |
| VII | Trichlorocyanuric acid | 2.0 | 17 | <1 |

EXAMPLE VIII

Following the procedure of Example I, but using a magnesium ribbon as the anode, magnesium perchlorate as the electrolyte solute and manganese dioxide as the depolarizer, provides a cell which gives a closed circuit voltage range of 1–0.8 volt at a current of 7–5.5 milliamperes for about 2 hours.

Modification is possible in the selection of materials for anode, cathode and solute as well as in the construction of the cell without departing from the scope of the invention.

What is claimed is:

In an electric current-producing cell having an anode of a metal selected from the group consisting of alkali and alkaline earth metals, a depolarizing cathode having a potential at least one volt less than that of the anode and an electrolyte consisting essentially of a non-conductive solvent and a solute of ionizable material dissolved in said solvent, said dissolution being the means of making said electrolyte electrically conductive, the improvement consisting of said solvent consisting essentially of acetic anhydride.

References Cited by the Examiner

UNITED STATES PATENTS 2,597,455   5/1952   Coleman et al.
2,937,219   5/1960   Minnick et al.
3,023,262   2/1962   Emmerling et al.

OTHER REFERENCES

Badoz-Lambling et al.: Chemical Abstracts, vol. 59, No. 8, Oct. 14, 1963, col. 8175, article C, Exchange Scale of Chloride and Perchlorate Ions in Acetic Anhydride.

WINSTON A. DOUGLAS, *Primary Examiner.*

ALLEN B. CURTIS, B. J. OHLENDORF,
*Assistant Examiners.*